United States Patent
Eppler et al.

(10) Patent No.: US 7,129,608 B2
(45) Date of Patent: Oct. 31, 2006

(54) INNER ROTOR ELECTRIC MOTOR

(75) Inventors: Willi Eppler, Ratshausen (DE); Markus Gummich, VS-Pfaffenweiler (DE)

(73) Assignee: Mineabea Co., Ltd., Nagano-Ken (JP)

( * ) Notice: Subject to any disclaimer, the term of this patent is extended or adjusted under 35 U.S.C. 154(b) by 29 days.

(21) Appl. No.: 10/858,062

(22) Filed: Jun. 2, 2004

(65) Prior Publication Data
US 2004/0245872 A1  Dec. 9, 2004

(30) Foreign Application Priority Data
Jun. 3, 2003  (DE) .......................... 203 08 665 U

(51) Int. Cl.
*H02K 5/00* (2006.01)
*H02K 1/00* (2006.01)
(52) U.S. Cl. .......................... 310/89; 310/43; 310/217
(58) Field of Classification Search .................. 310/89, 310/42, 45, 216, 217, 43
See application file for complete search history.

(56) References Cited

U.S. PATENT DOCUMENTS

| | | | |
|---|---|---|---|
| 3,622,822 A | * | 11/1971 | Lofstrand .................... 310/89 |
| 3,932,929 A | | 1/1976 | Hallerback et al. |
| 4,780,635 A | * | 10/1988 | Neumann .................... 310/216 |
| 5,239,221 A | * | 8/1993 | Juan ............................ 310/258 |
| 6,018,208 A | * | 1/2000 | Maher et al. ................ 310/254 |
| 6,043,583 A | * | 3/2000 | Kurosawa et al. .......... 310/254 |

FOREIGN PATENT DOCUMENTS

| | | | | |
|---|---|---|---|---|
| DE | 03444143 | * | 6/1990 | ................... 310/89 |
| DE | 19857954 | | 6/2000 | |
| GB | 2042280 | * | 9/1980 | ................... 310/89 |

* cited by examiner

*Primary Examiner*—Tran Nguyen
(74) *Attorney, Agent, or Firm*—Duane Morris LLP

(57) ABSTRACT

The present invention provides an inner rotor electric motor, in which the stator core is divided into a plurality of stator segments extending in an axial direction which are accommodated in corresponding stator casing segments. The stator segments are preferably constructed in an identical manner; the corresponding stator casing segments are also preferably substantially identical to each other. Means of connection to mechanically connect the stator segments and the corresponding stator casing segments is provided as well as means of electrically coupling the phase windings.

18 Claims, 4 Drawing Sheets

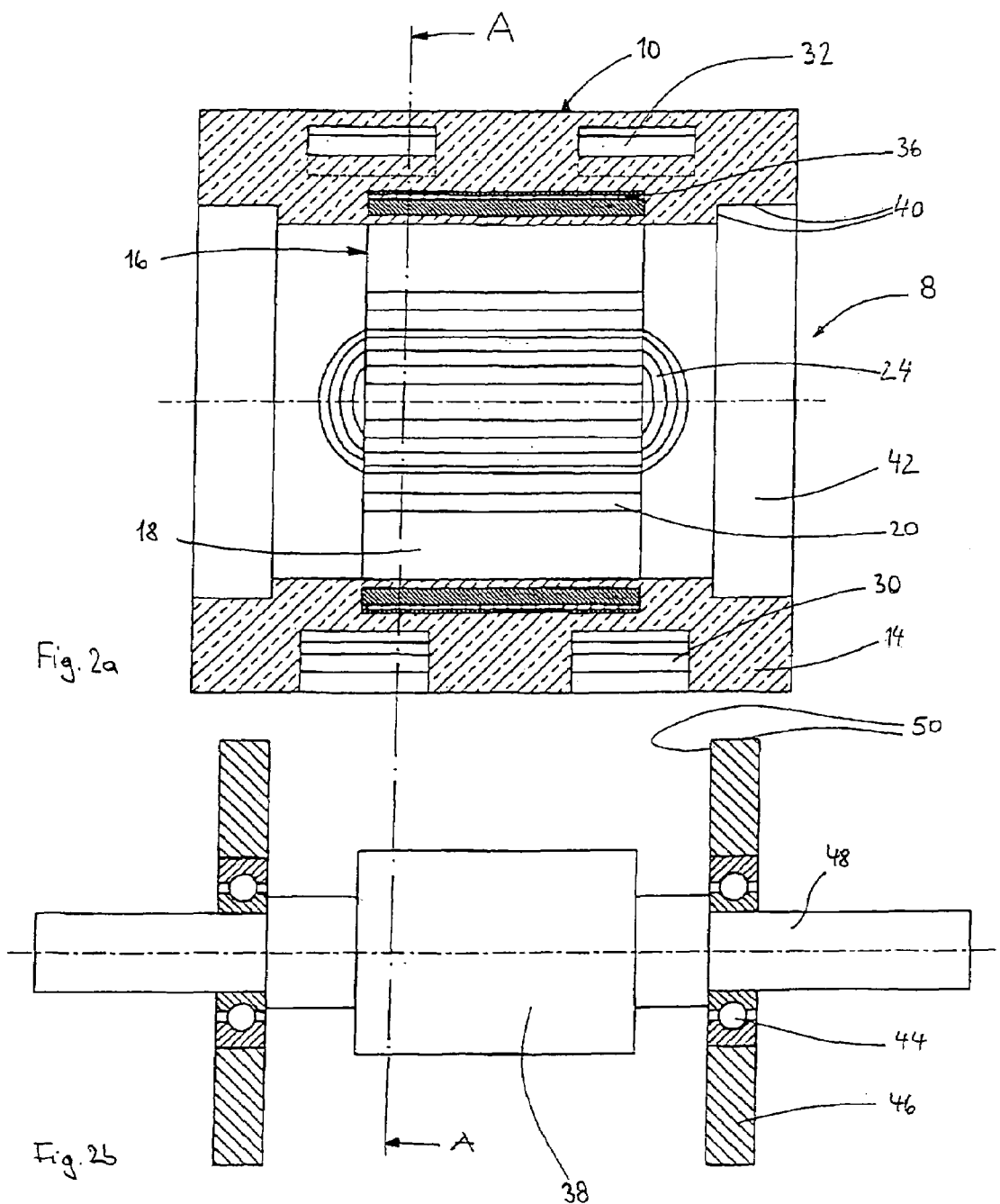

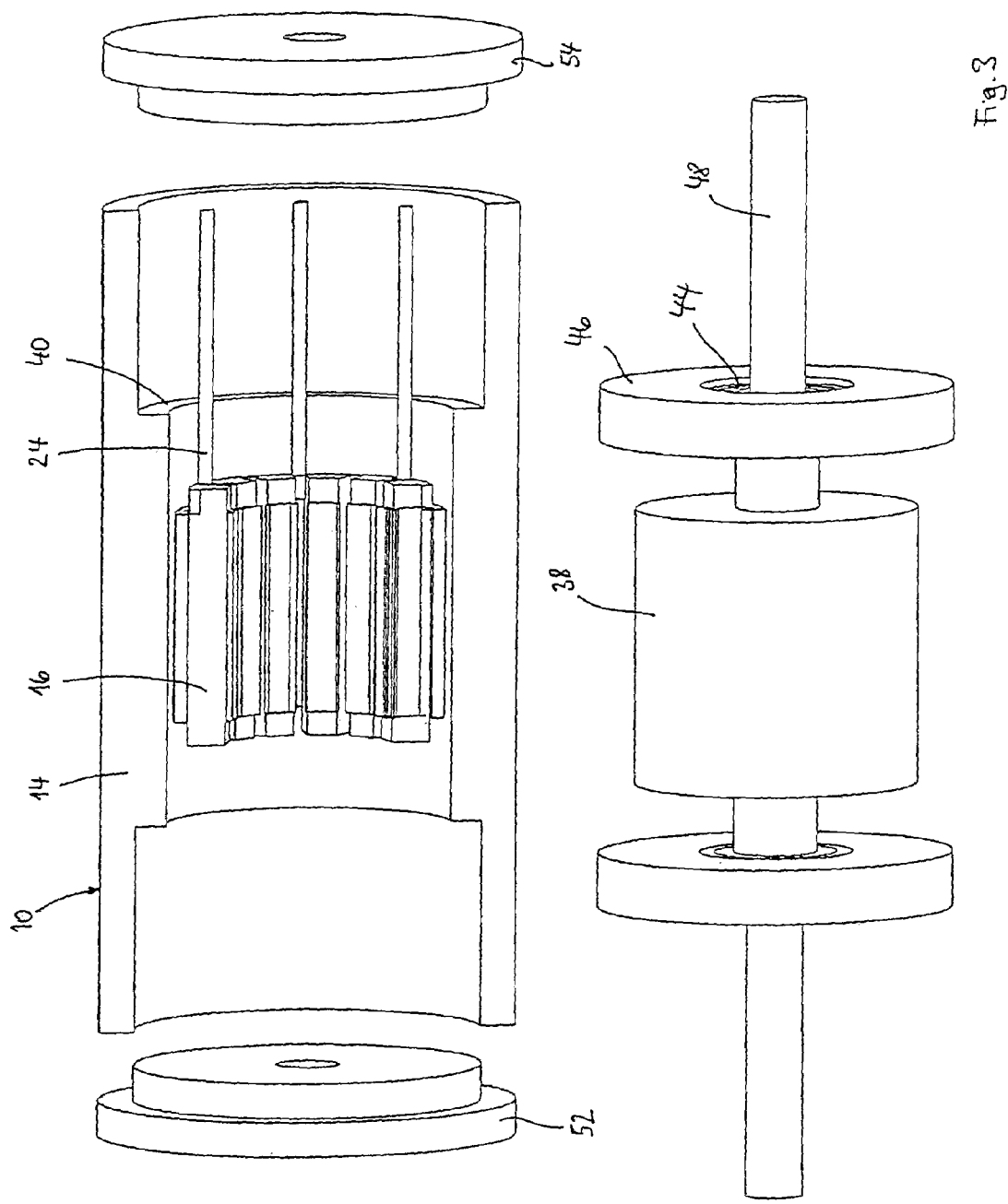

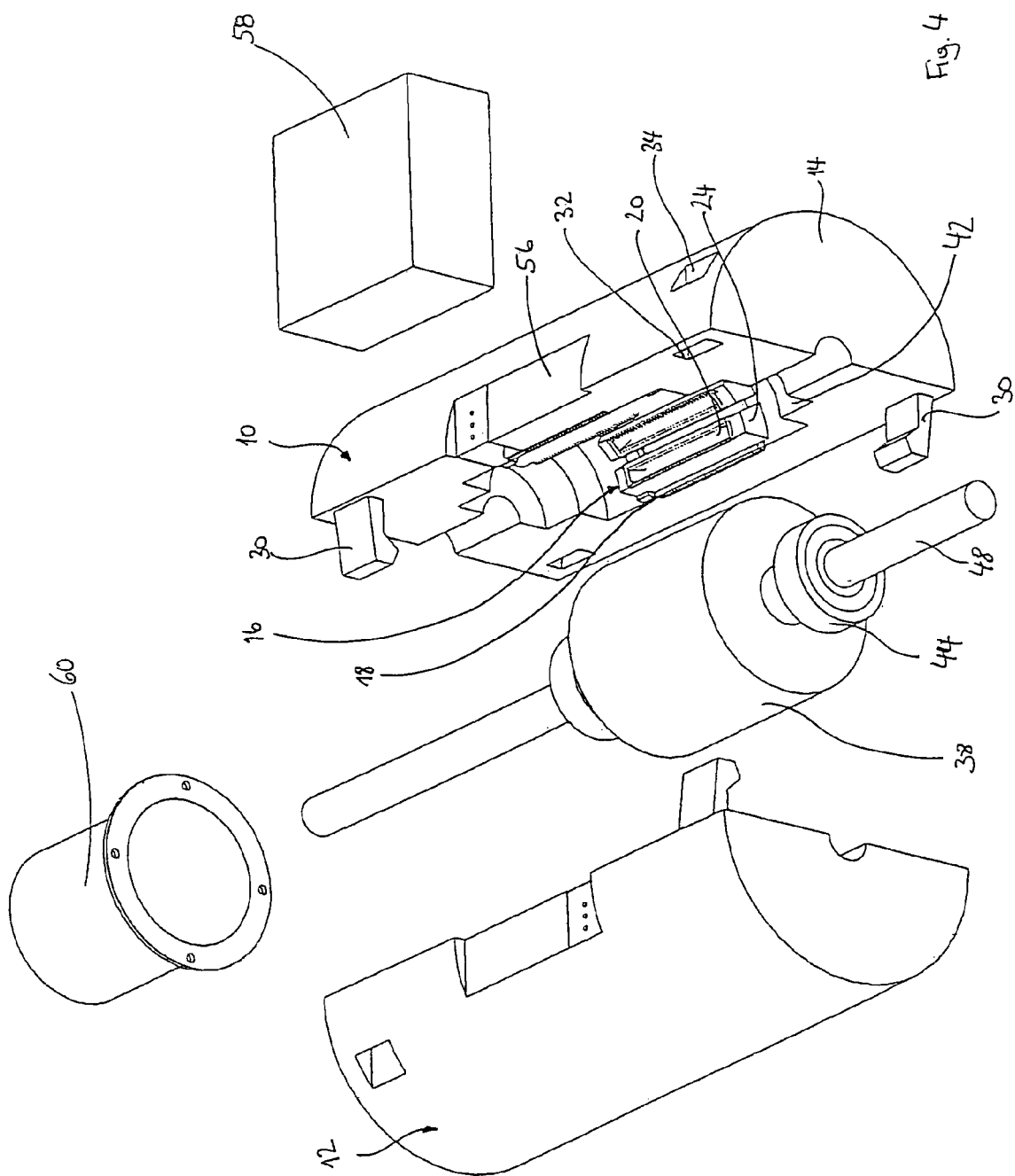

INNER ROTOR ELECTRIC MOTOR

BACKGROUND OF THE INVENTION

This application claims priority to the filing date of German Utility Model Application No. 203 08 665.1 filed Jun. 3, 2003.

1. Field of the Invention

The invention relates to an inner rotor electric motor comprising a stator core having an annular stator back yoke and a plurality of stator poles. The stator poles project radially inwards from the inner surface of the stator back yoke. The stator core encloses an assembly consisting of a shaft and a rotor, the shaft and the rotor being rotatably supported in respect of the stator by means of roller bearings.

The invention relates in general to the field of electronically commutated brushless direct current motors and other permanent magnet motors that are configured as inner rotor motors.

2. Background of the Invention

Such motors known from the prior art comprise a shaft, a rotor assembly having a magnetically soft back yoke and one or several permanent magnets disposed on it, and a stator assembly including a stator core composed of laminations, for example, and phase windings. Two bearings are arranged on the shaft on each side of the rotor assembly at an axial distance from each other to journal the rotor assembly in respect of the stator assembly. The electric motor according to the invention is not limited to any specific application and can be used in the automotive sector, for example, to support the steering, to operate the windscreen wipers or to drive a cooling water pump just as it can be used as a drive motor for fans, disk drives, machine tools or suchlike.

Inner rotor motors have the basic disadvantage that due to the cylinder-shaped, closed stator, they have to be mounted in an axial direction which involves limitations for inserting and adjusting the components inside the stator. The cause of this is the magnetic forces that work in an axial and radial direction between the stator and the permanent magnets of the rotor. Moreover, it is difficult to apply the phase windings to the stator poles of a stator core. For this purpose, highly complex winding techniques and machines, such as needle winders, are used.

The object of the invention is to provide an inner rotor electric motor that is easy to manufacture and to assemble.

SUMMARY OF THE INVENTION

This object has been achieved by the inner rotor electric motor with the characteristics revealed in claim 1.

In accordance with the invention, the stator core is divided into a plurality of stator segments extending in an axial direction which are accommodated in corresponding stator casing segments. The stator segments are preferably constructed in an identical manner; the corresponding stator casing segments are also preferably substantially identical to each other. Means of connection to mechanically connect the stator segments and the corresponding stator casing segments is provided as well as means of electrically coupling the phase windings.

The invention preferably provides a stator core which is built up of two stator segments and two corresponding stator casing segments each of which forms one half of the stator. The stator core according to the invention can of course be divided into more than two segments and the individual segments can extend over varying portions of the circumference of the stator core. The stator segments are preferably coupled using a hinge and/or snap-in connections.

The invention thus creates a stator divided once or several times wherein the separate inner surfaces, together with the stator poles arranged on them, are freely accessible, as a result of which the winding technique for applying the phase windings can be significantly simplified compared with a conventional stator core. For example, instead of using a needle winder to wind the poles of the stator core presented in the invention, a flyer winder can be used, which means that the time needed for the winding process can be significantly reduced. It is also possible to make better use of the slots between the stator poles and to significantly increase the space factor. The improved access to the cylindrical inner surface of the stator core additionally allows a slot insulating material to be applied to the cylindrical inner surface of the stator back yoke and the stator poles. This can be effected, for example, in an injection molding process.

The assembly of the electric motor is also significantly simplified by the stator core design presented in the invention and less susceptible to damage which can be caused by magnetic forces during assembly.

The pre-assembled rotor assembly, consisting of a rotor shaft together with a back yoke, the permanent magnets fixed to the outside circumference of the back yoke and the ball bearings disposed on the rotor shaft, is inserted into one of the stator segments, for example, in one of the two halves of the stator. Here, the radial proximity of the two components is limited by the contacting outer diameter of the ball bearings and the associated (half) bearing supports located in the respective stator half. By means of the effective radial magnetic forces generated in the air gap between the stator halves and the rotor, the two pre-assembled components are positioned and confined in such a way that the stator core can be easily completed, by putting on the second half of the stator, and secured using the snap-in device or fastener provided. Following this, the completed stator core fully encloses the rotor assembly, rotatably supported within the stator core, while forming a concentric air gap.

For this purpose, the stator casing segments are preferably formed in such a way that they provide a bearing support for each of the roller bearings as well as suitable stops to mount the assembly consisting of shaft, rotor and roller bearings.

In a particularly suitable embodiment, the stator casing segments are formed as injection molded parts into which a receiving portion for the corresponding stator segment as well as for the roller bearings and a suitable means of connection to mechanically couple the stator casing segments are integrated as a single piece.

In another embodiment, the stator can also be divided, for example, into three, in respect of a three-phase motor, the middle stator segment possibly being connected to the two outer segments by means of injection molded film hinges.

In a particularly suitable embodiment, a coupling module is also integrated into the stator segments and/or the stator casing segments which contacts the phase windings and establishes a connection for the phase windings to the outside and/or to adjacent stator segments. This makes it particularly easy to use pre-wound stator segments, the phase windings being suitable connected by means of the prefabricated coupling module.

The stator segments can be fixed in the stator casing segments using feather keys.

In one suitable embodiment, the stator casing segments are accommodated in a motor housing after the shaft and the rotor have been mounted within the stator core.

BRIEF DESCRIPTION OF DRAWINGS

The invention is described in more detail below on the basis of preferred embodiments with reference to the drawings. The figures show:

FIGS. 2a and 2b longitudinal sections through the stator core and through a rotor assembly of the inner rotor electric motor shown in FIG. 1;

FIG. 3 a schematic exploded view of an inner rotor electric motor having a stator core in accordance with a second embodiment of the invention;

FIG. 4 a schematic exploded view of an inner rotor electric motor having a stator core in accordance with a third embodiment of the invention.

DETAILED DESCRIPTION OF PREFERRED EMBODIMENTS

Figure 1:
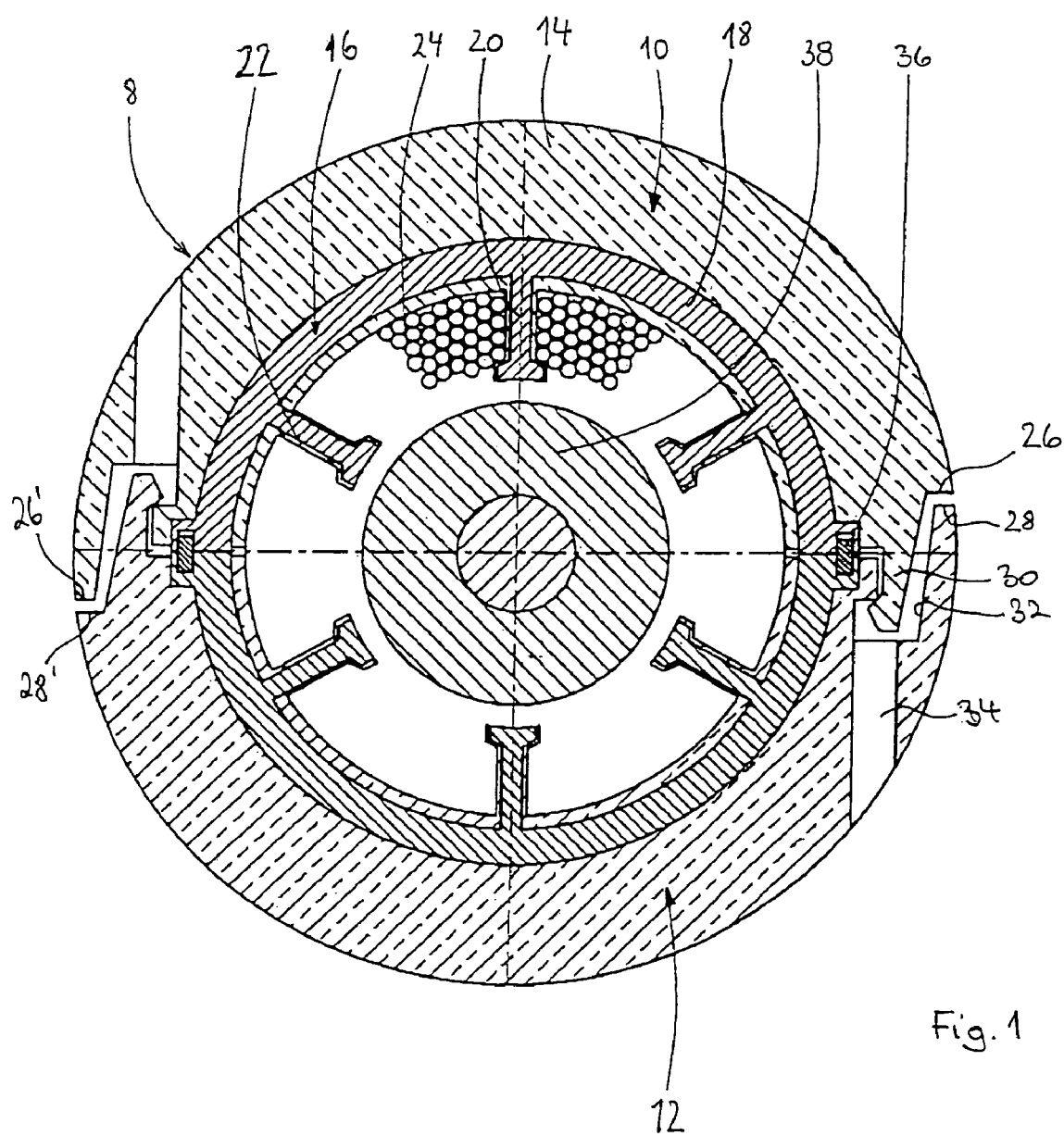
FIG. 1 a cross-sectional view through an inner rotor electric motor having a stator core in accordance with a first embodiment of the invention.

FIG. 1 schematically shows a cross-sectional view through an inner rotor electric motor having a stator core in accordance with the invention. In the illustrated embodiment, the stator core 8 comprises two stator halves 10, 12 which are essentially formed in the same way. Thus only one stator half 10 is described below, with corresponding facts also applying to the other stator half 12.

The stator half 10 comprises a stator casing segment 14 in which a corresponding stator segment 16 is accommodated. The stator segment 16 comprises a part of the stator back yoke 18 and stator poles 20. In the illustrated embodiment, the stator back yoke 18 and the stator poles 20 are injection molded with a slot insulating material 22. The slot insulating material 22 can be injection molded onto the inner surface of the stator back yoke 18 and the poles 20 in a separate manufacturing process or it can be formed in one injection molding process together with the stator casing segment 14 in which the stator segment 16 is fully embedded in the corresponding stator casing segment 14.

In FIG. 1, only one phase winding 24 is shown by way of example which is applied to one of the stator poles 20.

The stator halves 10, 12 are mechanically coupled at their side edges 26, 26', 28, 28'. For this purpose, a snap bar 30 is provided at the side edge 26 of the stator casing segment 14 which engages into a corresponding recess 32 in the edge 28 of stator half 12 lying opposite. The snap-in connection can be loosened with the aid of a tool placed in a free slot 34. An appropriate snap-in connection is provided on the opposite side of the stator core at the side edges 26', 28' of the two stator halves 10, 12. To additionally attach the stator halves 10, 12, a feather key 36 is arranged between the stator segments 16. The feather key has the task of counteracting the pressure of the snap bar 30 so that neither the cross-section of the stator back yoke is changed nor are the two stator segments offset in a radial direction. This goes to ensure a uniform concentric air gap. Other means can also be provided to ensure that the stator segments do not shift vis-à-vis each other in a radial direction. It is possible, for example, that the stator segments have a dovetail connection at their edges in the manner of a tongue and groove arrangement.

As mentioned above, the stator casing segments 14 are preferably formed as injection molded parts, the snap bar 30 and the corresponding recess 32 to create the snap-in connection being formed integrally with the stator casing segments 14. Moreover, the stator segments 16 are preferably embedded in the stator casing segments in such a way that slot insulation 22 is formed on the inner surface of the stator back yoke 18 and the stator poles 20. The stator segments 16 themselves can be made from laminated sheet metal or ferrite materials as is normally the case in the prior art.

In an alternative embodiment which is not illustrated in the figures, at least one of the snap-in connections can be replaced by a hinge.

A rotor assembly 38 is also schematically illustrated in FIG. 1, which is disposed and journaled within the stator core (8) and is distanced from the stator core (8) by the formation of a concentric air gap.

FIGS. 2a and 2b schematically show longitudinal sections through the stator core 8 or the rotor assembly 38 of FIG. 1, the illustration in FIG. 1 being a sectional view along the line A—A in FIGS. 2a, 2b. Corresponding components are identified with the same reference numbers and are not described in detail again.

Alongside the features already described in reference to FIG. 1, in FIG. 2a it is possible to recognize bearing support surfaces 40 in the stator casing segment 14 which form a bearing support 42 to accommodate a ball bearing 44 or a ball bearing mounting ring 46. The ball bearing 44 and the ball bearing mounting ring 46 are illustrated in FIG. 2b. The ball bearing 44 is placed on a shaft 48 on which the rotor assembly 38 is also mounted. The ball bearing mounting ring 46 has mounting surfaces 50 which are brought into contact with the bearing support surfaces 40 in order to mount the ball bearing 44 and the ball bearing mounting ring 46 in the stator casing segment 14 preferably using a press fit. The rotor assembly 38 is rotatably supported in respect of the stator core 8 via the ball bearings 44. One of ordinary skill in the art will be aware that other roller bearings can also be used instead of ball bearings.

FIG. 3 schematically shows an exploded view of a stator half and the rotor assembly of the inner rotor electric motor presented in the invention in a similar embodiment as shown in FIGS. 1, 2a and 2b in order to elucidate the invention. For the sake of clarity, some details that are shown in FIGS. 1, 2a and 2b have been left out. Corresponding components are identified by the same reference numbers.

In manufacturing the inner rotor electric motor in accordance with the invention, first the stator halves 10, 12 with the stator casing segments and with the stator segments 16 are made, the stator segments 16 being injection molded with the stator casing segments 14 or connected to them by some other means. The phase windings 24 are then applied to the stator poles of the stator segments 16. Here, simpler winding techniques can be applied than is the case for conventional stator cores for inner rotor electric motors since the stator poles are more accessible. In particular, instead of the relatively slower needle winders, the faster flyer winders can be used which are less complicated thus allowing the winding time to be significantly reduced. In addition, higher space factors can be achieved in winding the stator poles with the phase windings. Furthermore, a prefabricated assembly consisting of the shaft 48, the rotor assembly 38, the ball bearings 44 and the ball bearing mounting rings 46, where applicable, is prepared. This prefabricated assembly can then simply be put into a stator half 10 or into a stator segment, the stator core subsequently being completed with the remaining stator half or the remaining stator segments. The pre-assembled assembly is inserted into the stator segments in a positive fit. The individual stator segments are mechanically connected to each other, as described above, by means of a snap-in device, hinges or any other appropriate means, such as ultrasound welding. The exact form of the means of connection is not significant for the invention. What is important is that there is a mechanical coupling of the stator segments and an electric coupling of the phase windings. After the stator segments have been fitted together, the stator core can be sealed at its ends by means of covers 52, 54. Moreover, it is possible to insert the sealed or unsealed stator core into an extra motor housing (not shown), which can be optionally injection molded again.

FIG. 4 shows a schematic exploded view of an alternative embodiment of the inner rotor electric motor presented in the invention with further details. Corresponding components are indicated with the same reference numbers as in the previous figures.

The embodiment illustrated in FIG. 4 differs from the embodiments described earlier through the formation of a bearing support 42 that is dimensioned in such a way that the ball bearings 44 can be directly accommodated in it without the interposition of ball bearing mounting rings. The covers 52/54 can be already integrated or injection molded into this. The embodiment shown in FIG. 4 also has a coupling surface 56 and a coupling module 58 by means of which the phase windings 24 can be electrically adapted and lead towards the outside. This makes the electrical connection of the phase windings of the multi-part stator much simpler.

The inner rotor electric motor of FIG. 4 is essentially manufactured in the same way as described in reference to FIG. 3. The pre-assembled assembly consisting of the rotor 38, shaft 48 and ball bearings 44 is put into one of the stator halves 10, the motor then being completed by the other stator half 12. The two stator halves are mechanically connected to each other via the snap bar 30. The coupling module 58 is then placed on the coupling surface 56. The coupling surface 56 provides appropriate connections to the phase windings 24 which have been previously applied to the stator poles 20 of the stator segments 16. The coupling module 58 contains the necessary circuitry components to connect the phase windings to each other and to the outside.

The inner rotor electric motor assembled in this way can be accommodated in an additional motor housing in a positive fit. A small housing can 60 is additionally shown in FIG. 4 which is used to accommodate control electronics and sensors a rotor position encoder, for example, outside the motor housing.

The characteristics revealed in the above description, the claims and the figures can be important for the realization of the invention in its various embodiments both individually and in any combination whatsoever.

IDENTIFICATION REFERENCE LIST

8 Stator core
10 Stator half
12 Stator half
14 Stator casing segment
16 Stator segment
18 Stator back yoke
20 Stator poles
22 Slot insulating material
24 Phase winding
26, 26' Side edges of stator half 10
28, 28' Side edges of stator half 12
30 Snap bar
32 Recess
34 Free slot
36 Feather key
38 Rotor assembly
40 Bearing support surface
42 Bearing support
44 Ball bearing
46 Ball bearing mounting ring
48 Shaft
50 Mounting surface
52 Cover
54 Cover
56 Coupling surface
58 Coupling module
60 Housing can

The invention claimed is:

1. An electric motor comprising:
   a rotor (38) having a shaft (48);
   a stator (8) comprising a plurality of stator segments (16), each of said stator segments (16) comprising a part of a stator back yoke (18) and at least one of a plurality of stator poles (20), said at least one the plurality of stator poles (20) projecting radially from the stator (8); and
   at least two casing elements (14), each casing element (14) is defined as an injection molded assembly comprising the casing element (14) and at least one of the plurality of stator segments (16) such that said casing element (14) and said at least one stator segment (16) form an integrated unit, and each casing element (14) having coupling means (26, 28) for engaging to other casing elements (12);
   wherein said stator (8) is formed by coupling together said at least two casing elements (14).

2. The electric motor of claim 1, further comprising sealing means (52, 54).

3. The electric motor of claim 1, wherein the rotor (10) further comprises at least one mounting ring (46) engaging to the rotor shaft (48) through a ball bearing (44).

4. The electric motor of claim 1, further comprising a coupling module (58) for electrically engaging phase windings (24).

5. The electric motor of claim 1, further comprising a coupling module (58) for electrically communicating with the motor assembly.

6. The electric motor of claim 1, wherein the coupling means (26, 28) includes at least one hinge.

7. The electric motor of claim 1, wherein the coupling means (26, 28) includes a latch.

8. The electric motor of claim 1, further comprising at least one snap-bar (30) for coupling the casing elements (14).

9. The electric motor of claim 1, wherein the stator yoke back (18) and the stator poles (20) further comprise insulating material (22).

10. The electric motor of claim 1, wherein each casing element is defined as an injection molded assembly comprising the casing element (14) and at least one of the stator segment (16) and slot insulating material (22).

11. The electric motor of claim 1, wherein the number of casing elements is greater than or equal to three.

12. A stator (8) for use in an electromagnetic motor, the stator comprising:
    a plurality of stator segments (16), each of said stator segments (16) comprising a part of stator back yoke (18) and at least one of a plurality of stator poles (20);
    each stator segment (16) configured to engage to another stator segment (16) to form an enclosed circle; and
    at least two casing elements (14), each casing element (14) is defined as an injection molding molded assembly comprising the casing element (14) and at least one of the plurality of stator segments (16) such that said casing element (14) and said at least one stator segment (16) form an integral unit;

wherein at least one casing element (14) is configured with a latch (30) for engaging at least one other casing element.

13. The stator of claim 12, further comprising a phase winding encompassing a portion of the stator poles (20).

14. The stator of claim 12, wherein the stator casing (14) further comprises a slot (34) for disengaging the plurality of stator casings (14).

15. The stator of claim 12, wherein the stator poles (20) is coated with an insulating material.

16. The stator of claim 12, wherein each casing element is defined as an injection molded assembly comprising the casing element (14) and at least one of the stator segment (16) and slot insulating material (22).

17. An electric motor comprising:

a rotor (38) having a shaft (48);

a stator (8) comprising a plurality of stator segments (16), each of said stator segments (16) comprising a part of a stator back yoke (18) and at least one of a plurality of stator poles (20), said at least one the plurality of stator poles (20) projecting radially from the stator (8);

at least two casing elements (14), each casing element (14) formed by injection molding and housing at least one of the plurality of stator segments (16) such that said casing element (14) and said at least one stator segment (16) form an integrated unit, and each casing element (14) having coupling means (26, 28) for engaging to other casing elements (12);

wherein said stator (8) is formed by coupling together said at least two casing elements (14); and wherein each casing element is defined as an injection molded assembly comprising the casing element (14) and at least one of the stator segment (16) and slot insulating material (22).

18. A stator (8) for use in an electromagnetic motor, the stator comprising:

a plurality of stator segments (16), each of said stator segments (16) comprising a part of stator back yoke (18) and at least one of a plurality of stator poles (20);

each stator segment (16) configured to engage to another stator segment (16) to form an enclosed circle; and at least two casing elements (14), each casing element (14) formed by defined as an injection molded assembly comprising the casing element (14) and accommodating at least one of the plurality of stator segments (16) such that said casing element (14) and said at least one stator segment (16) form an integral unit;

wherein at least one casing element (14) is configured with a latch (30) for engaging at least one other casing element; and wherein each casing element is defined as an injection molded assembly comprising the casing element (14) and at least one of the stator segment (16) and slot insulating material (22).

* * * * *